United States Patent
Jeong et al.

(10) Patent No.: US 12,197,781 B2
(45) Date of Patent: Jan. 14, 2025

(54) HOST-STORAGE SYSTEM THAT INCLUDES A COMMAND QUEUING METHOD AND A METHOD OF ADJUSTING THE PROCESSING SPEED OF MULTIPLE QUEUES

(71) Applicants: SAMSUNG ELECTRONICS CO., LTD., Suwon-si (KR); RESEARCH BUSINESS FOUNDATION SUNGKYUNKWAN UNIVERSITY, Suwon-si (KR)

(72) Inventors: Jinkyu Jeong, Suwon-si (KR); Jiwon Woo, Anyang-si (KR)

(73) Assignees: SAMSUNG ELECTRONICS CO., LTD., Suwon-si (KR); RESEARCH BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 0 days.

(21) Appl. No.: 17/403,876

(22) Filed: Aug. 16, 2021

(65) Prior Publication Data

US 2022/0269442 A1 Aug. 25, 2022

(30) Foreign Application Priority Data

Feb. 23, 2021 (KR) .................. 10-2021-0024161

(51) Int. Cl.
*G06F 13/16* (2006.01)
*G06F 3/06* (2006.01)
*G06F 13/18* (2006.01)

(52) U.S. Cl.
CPC .......... *G06F 3/0659* (2013.01); *G06F 3/0611* (2013.01); *G06F 3/0673* (2013.01); *G06F 13/1668* (2013.01); *G06F 13/18* (2013.01)

(58) Field of Classification Search
CPC .... G06F 3/0659; G06F 3/0611; G06F 3/0673; G06F 13/1668; G06F 13/18
See application file for complete search history.

(56) References Cited

U.S. PATENT DOCUMENTS

| | | | |
|---|---|---|---|
| 8,090,903 B2 | 1/2012 | Bernardi et al. | |
| 8,468,318 B2 | 6/2013 | Colgrove et al. | |

(Continued)

FOREIGN PATENT DOCUMENTS

| | | |
|---|---|---|
| KR | 10-1652324 | 8/2016 |
| KR | 16-65008 | 9/2016 |

(Continued)

OTHER PUBLICATIONS

The NVM ExpressTM Base Specification, Revision 1.4, published Jun. 10, 2019 attached to this office action and available online at https://nvmexpress.org/wp-content/uploads/NVM-Express-1_4-2019.06.10-Ratified.pdf (Year: 2019).*

(Continued)

*Primary Examiner* — Michael Krofcheck
*Assistant Examiner* — Janice M. Girouard
(74) *Attorney, Agent, or Firm* — F. CHAU & ASSOCIATES, LLC

(57) ABSTRACT

A method of queuing command comprises: comparing a first virtual time of a first command with a second virtual time of a second command and obtaining a comparison result; determining a standard global virtual time from the first virtual time and the second virtual time on the basis of the comparison result; and sending each of the first and second commands to one of a first priority class queue, a second priority class queue, and a third priority class queue, based on a difference between the first virtual time and the global virtual time, and a difference between the second virtual time and the global virtual time, wherein each of the first to (Continued)

third priority class queues has processing speeds that differ from each other.

11 Claims, 7 Drawing Sheets

(56) References Cited

U.S. PATENT DOCUMENTS

| | | |
|---|---|---|
| 8,732,339 B2 | 5/2014 | Shin et al. |
| 10,628,216 B2 | 4/2020 | Miao et al. |
| 10,776,013 B2 | 9/2020 | Gupta et al. |
| 2018/0293101 A1 | 10/2018 | Park et al. |
| 2019/0303309 A1 | 10/2019 | Sahoo et al. |
| 2019/0339905 A1* | 11/2019 | Mizuno ................. G06F 3/0659 |

FOREIGN PATENT DOCUMENTS

| | | |
|---|---|---|
| KR | 10-1730991 | 4/2017 |
| KR | 10-2017-0083890 | 7/2017 |

OTHER PUBLICATIONS

A shapshot of the https://www.snia.org/education/online-dictionary/W web page taken by archive.org on Oct. 19, 2019 (Year: 2019).*

Partial European Search Report for European Application Serial No. 21207632.7 dated May 9, 2022.

* cited by examiner

HOST-STORAGE SYSTEM THAT INCLUDES A COMMAND QUEUING METHOD AND A METHOD OF ADJUSTING THE PROCESSING SPEED OF MULTIPLE QUEUES

This application claims priority under 35 USC § 119 from Korean Patent Application No. 10-2021-0024161, filed on Feb. 23, 2021 in the Korean Intellectual Property Office, the contents of which are herein incorporated by reference in their entirety.

BACKGROUND

1. Technical Field

Embodiments of the present disclosure are directed to a host-storage system that includes a command queuing method and a method of adjusting the processing speed of multiple queues.

2. Discussion of the Related Art

A host is an entity that can interact with a controller by sending commands that depend on NVMe specifications. The NVMe or NVMHCI (Non-Volatile Memory Host Controller Interface Specification) specification is a logical device interface specification for accessing a non-volatile storage medium connected through a PCIe bus.

The NVMe is an extensible host controller interface that addresses the demands of enterprise and client system. Multiple interfaces, such as administrative (Admin) or input/output (I/O) queues, can exist for data transfer between a host and a storage controller (NVMe controller). The NVMe controller is associated with a PCIe function that processes commands from the host, and sends the appropriate response to the host, depending on the NVMe specifications. For example, an NVMe subsystem may include a single PCIe port and multi-namespaces.

In the past, scheduling has been performed using host-side computing resources to satisfy fairness between users, programs or flows. Currently, although the NVMe provides a scheduling function between the command queues, because this assigns only the processing frequency, the NVMe may not satisfy fairness as it is. Therefore, to reduce the usage of the host-side computing resources, measures should be devised that utilize the scheduling function provided by NVMe to ensure the fairness.

SUMMARY

Embodiments of the present disclosure provide a command queuing method that reduces a utilization rate of the host core.

Embodiments of the present disclosure also provide a method of adjusting the processing speed of multiple queues that reduces the utilization rate of the host core.

Embodiments of the present disclosure also provide a host-storage system that reduces the utilization rate of the host core.

According to some embodiments of the present disclosure, there is provided a method of queuing commands, the method comprising: comparing a first virtual time of a first command with a second virtual time of a second command, and obtaining a comparison result; determining a standard global virtual time from the first virtual time and the second virtual time on the basis of the comparison result; and sending each of the first and second commands to one of a first priority class queue, a second priority class queue, or a third priority class queue, based on a difference between the first virtual time and the global virtual time, and a difference between the second virtual time and the global virtual time, wherein each of the first to third priority class queues has processing speeds that differ from each other.

According to some embodiments of the present disclosure, there is provided a method of adjusting processing speeds of multiple queues, the method comprising: sending each of a first command and a second command that differs from the first command to one of first to third priority class queues; calculating a first processing frequency value of the first to third priority class queues; and adjusting the processing speeds of the first to third priority class queues on the basis of the first processing frequency value.

According to some embodiments of the present disclosure, there is provided a host-storage system, comprising: a host interface that receives a first command and a second command from a host through an NVMe (Non-Volatile Memory Express) interface; a WRR arbitration unit that includes first to third priority class queues; and an I/O scheduler that sends the first and second commands to the first to third priority class queues, wherein the WRR arbitration unit receives a processing frequency calculated for each of the priority class queues from the I/O scheduler and performs the command in the queue in a weighted round robin manner on the basis of the processing frequency.

Other features and embodiments may be apparent from the following detailed description, the drawings and the claims.

DETAILED DESCRIPTION

Hereinafter, embodiments according to the technical idea of the present disclosure will be described with reference to the accompanying drawings.

Figure 1:
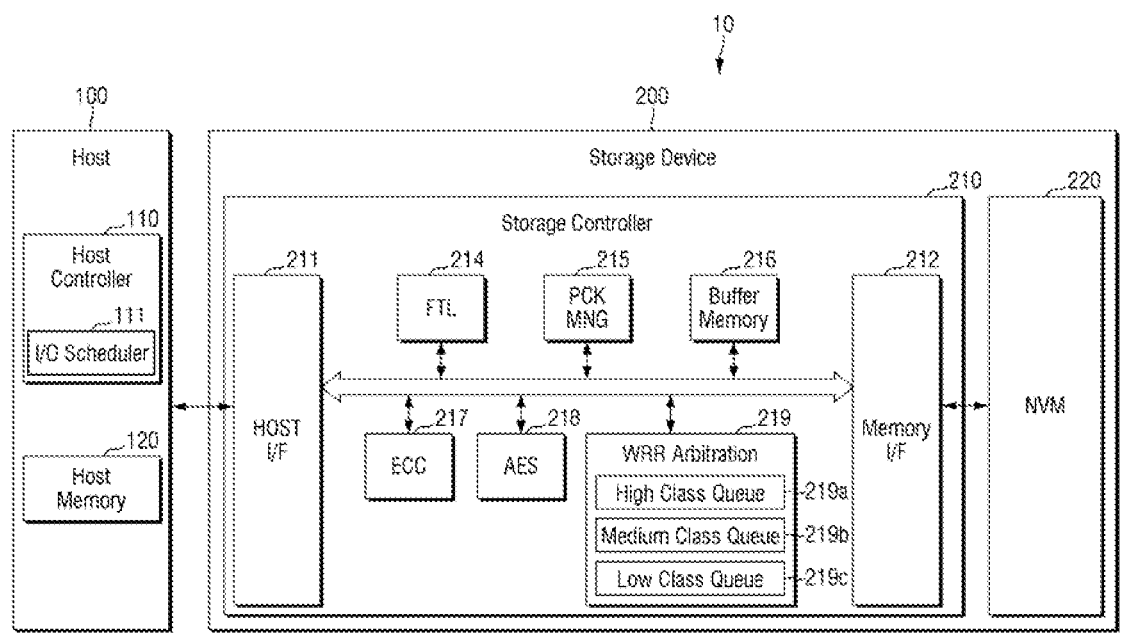
FIG. 1 is a block diagram of a host-storage system according to some embodiments.

FIG. 1 is a block diagram of a host-storage system according to some embodiments.

Referring to FIG. 1, in some embodiments, a host-storage system 10 includes a host 100 and a storage device 200. The storage device 200 includes a storage controller 210 and a non-volatile memory (NVM) 220. According to exemplary embodiments of the invention, the host 100 includes a host controller 110 and a host memory 120. The host memory 120 functions as a buffer memory that temporarily stores data to be transmitted to the storage device 200 or receives data transmitted from the storage device 200.

In some embodiments, the host controller 110 further includes an I/O scheduler 111.

In some embodiments, the I/O scheduler 111 selectively or dynamically sends I/O commands to a WRR arbitration unit 219.

In some embodiments, the storage device 200 includes storage medium that stores data in response to a request from the host 100. For example, the storage device 200 may include at least one of a SSD (Solid State Drive), an embedded memory, or a detachable external memory. If the storage device 200 is an SSD, the storage device 200 complies with an NVMe (non-volatile memory express) standard. If the storage device 200 is an embedded memory or an external memory, the storage device 200 complies with a UFS (universal flash storage) or an eMMC (embedded multi-media card) standard. The host 100 and the storage device 200 each generate and transmit packets according to the adopted standard protocol.

In some embodiments, when the non-volatile memory 220 of the storage device 200 includes a flash memory, the flash memory may include a 2D NAND memory array or a 3D (or vertical) NAND (VNAND) memory array. For another example, the storage device 200 also includes various other types of non-volatile memories. For example, a MRAM (Magnetic RAM), a Spin-Transfer Torque MRAM, a conductive bridging RAM (CBRAM), a FeRAM (Ferroelectric RAM), a PRAM (Phase RAM), a resistive memory (Resistive RAM) and various other types of memory may be used as the storage device 200.

In some embodiments, the host controller 110 and host memory 120 are implemented as separate semiconductor chips. Alternatively, in some embodiments, the host controller 110 and the host memory 120 are integrated on the same semiconductor chip. For example, the host controller 110 is one of a plurality of modules provided in an application processor, and the application processor is implemented as a system on chip (SoC). Further, the host memory 120 may be an embedded memory provided inside the application processor, or may be a non-volatile memory or a memory module disposed outside the application processor.

In some embodiments, the host controller 110 manages the operation of storing data, such as recorded data, of a buffer area of the host memory 120 in the non-volatile memory 220, or storing data, such as read data, of the non-volatile memory 220 in the buffer area.

In some embodiments, the storage controller 210 includes a host interface 211, a memory interface 212, and a core. Further, the storage controller 210 furthers include a flash translation layer (FTL) 214, a packet manager 215, a buffer memory 216, an ECC (error correction code) engine 217, an AES (advanced encryption standard) engine 218, and a WRR (Weighted Round Robin) arbitration unit 219.

In some embodiments, the storage controller 210 further includes a working memory into which the flash translation layer 214 is loaded, and when the core executes the flash translation layer, the core controls data recording and reading operations of the non-volatile memory 220.

In some embodiments, the host interface 211 transmits and receives packets to and from the host 100. Packets transmitted from the host 100 to the host interface 211 include command CMD or data to be recorded in the non-volatile memory 220, and packets transmitted from the host interface 211 to the host 100 include responses to commands, data read from the non-volatile memory 220, etc. In some embodiments, the host interface 211 includes an interface according to NVM-Express/v1.4/section 4.13.2— Weighted Round Robin with Urgent Priority Class Arbitration specification.

In some embodiments, the memory interface 212 transmits data to be recorded in the non-volatile memory 220 to the non-volatile memory 220 or receives data read from the non-volatile memory 220. The memory interface 212 complies with standard conventions such as Toggle or ONFI (Open NAND Flash Interface).

In some embodiments, the core receives the command CMD from the host 100. The core sends the transmitted command CMD to the I/O scheduler 111. The core determines the priority class queues 219a to 219c of the WRR arbitration unit 219 for the command CMD.

In some embodiments, the flash translation layer 214 performs various functions such as address mapping, wear-leveling, and garbage collection. Address mapping changes a logical address received from the host 100 into a physical address which is used for actually storing the data in the nonvolatile memory 220. Wear-leveling ensures that blocks in the nonvolatile memory 220 are uniformly used to prevent excessive degradation of a particular block, and may be implemented, for example, through a firmware technique that balances the erasure counts of the physical blocks. Garbage collection ensures an available capacity in the nonvolatile memory 220 by copying valid data of an existing block to a new block and then erasing the existing block.

In some embodiments, the packet manager 215 generates a packet according to the protocol of the interface discussed with the host 100, or parses various types of information from the packet received from the host 100.

In some embodiments, the buffer memory 216 temporarily stores data to be recorded in the nonvolatile memory 220 or data that has been read from the nonvolatile memory 220. The buffer memory 216 may provided inside the storage controller 210, but may also be placed outside the storage controller 210.

In some embodiments, an ECC engine 217 performs error detection and correction functions on the read data that is read from the nonvolatile memory 220. More specifically, the ECC engine 217 generates parity bits on the write data to be written to the nonvolatile memory 220, and the generated parity bits are stored in the nonvolatile memory 220 together with the write data. When reading the data from the nonvolatile memory 220, the ECC engine 217 uses the parity bits that are read from the nonvolatile memory 220 together with the read data to detect and correct errors of the read data, and outputs the corrected read data.

In some embodiments, the AES engine 218 performs at least one of encrypting or decrypting data that is input to the storage controller 210 using a symmetric-key algorithm.

In some embodiments, the WRR arbitration unit 219 includes a first priority class queue 219a, a second priority class queue 219b and a third priority class queue 219c. The WRR arbitration unit 219 receives a command CMD from the core into one of the first to third priority class queues 219a to 219c. The WRR arbitration unit 219 adjusts the processing speed of commands or queues on the basis of a processing frequency value.

In some embodiments, the first priority class queue 219a queues command CMD to be processed at the fastest speed, the third priority class queue 219c queues command CMD to be processed at the slowest speed, and the second priority class queue 219b queues command CMD to be processed at an intermediate speed between the fastest speed and the slowest speed.

Figure 2:
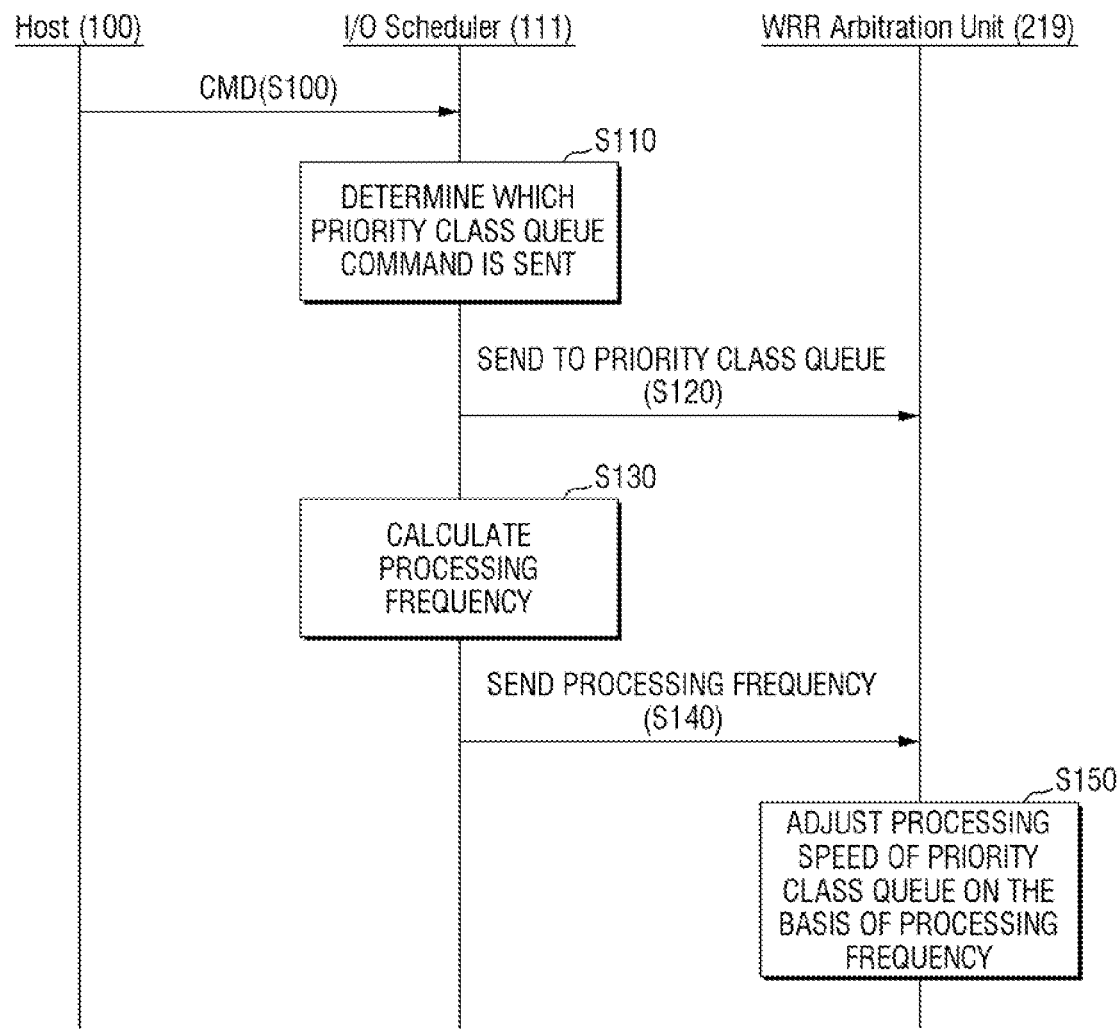
FIG. 2 is a flowchart of an operation of a host-storage system according to some embodiments.

FIG. 2 is a flowchart of an operation of a host-storage system according to some embodiments.

FIGS. 3 to 7 illustrate the operation of a host-storage system according to some embodiments.

Referring to FIG. 2, a command is transmitted from the host to the I/O scheduler (S100).

Specifically, in some embodiments, referring to FIG. 1, the host controller 110 receives the command CMD that requests execution of an operation of the I/O scheduler 111. The command CMD may be a command in one flow, or may be commands of flows that differ from each other.

In some embodiments, the operation includes, for example, an operation of inputting the data into the nonvolatile memory cell of the non-volatile memory 220 addressed to a logical or physical address, or an operation of outputting the data stored in the non-volatile memory cell of the non-volatile memory 220 addressed to the logical or physical address. However, embodiments are not limited thereto, and the examples of operations of the memory of the non-volatile memory 220 may be modified as many times as necessary.

Next, in some embodiments, the I/O scheduler determines which of the priority class queues to which the received command is sent (S110).

Specifically, in some embodiments, referring to FIG. 1, the I/O scheduler 111 generates the inputs and outputs of the command CMD to be transmitted to the non-volatile memory 220 that correspond to the command CMD received from the host 100. Further, the I/O scheduler 111 determines to which of the priority class queues of the WRR arbitration unit 219 the generated commands are sent.

Next, in some embodiments, the I/O scheduler sends the command to the priority class queue of the WRR arbitration (S120).

Figure 3:
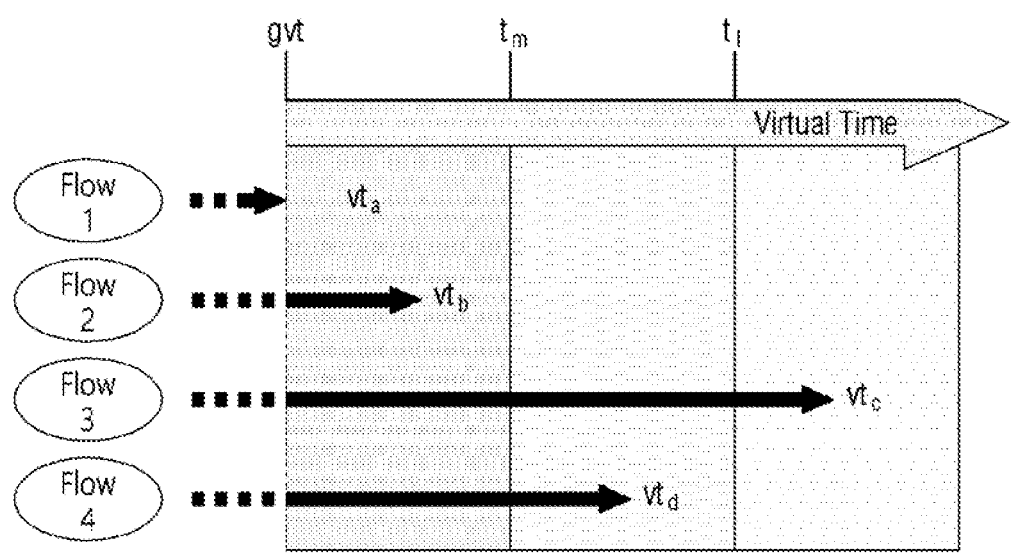
FIGS. 3 to 7 illustrate the operation of a host-storage system according to some embodiments.

Specifically, in some embodiments, a method by which the I/O scheduler 111 queues the command requested by the flow or the program will be described with reference to FIGS. 3 and 5. Here, program and flows have the same meaning and may be referred to as a flow. FIG. 3 shows 4 flows: Flow1, Flow2, Flow3 and Flow4.

In some embodiments, the V/O scheduler 111 determines a global virtual time (gvt) from virtual times of the first to fourth flows (Flow1 to Flow4). The virtual time refers to a value determined by dividing a total amount of provided input/output services of the flows by weights of each flow and then leveling.

Further, in some embodiments, the I/O scheduler 111 determines the priority class queue for queuing the first to fourth commands (CMD1 to CMD4) in consideration of each of the first to fourth flows (Flow1 to Flow4) and/or the virtual times (vta to vtd) of the commands (CMD1 to CMD4) of the first to fourth flows (Flow1 to Flow4), on the basis of the determined global virtual time (gvt). Although one flow Flow may be associated with various commands CMD, or various commands CMD may be associated with various flows (Flow), embodiments are not limited thereto.

In some embodiments, when a difference between the first to fourth flows (Flow1 to Flow4) or the virtual times (vta to vtd) of the first to fourth commands (CMD1 to CMD4) of the first to fourth flows (Flow1 to Flow4) and the global virtual time (gvt) is greater than a first threshold tl, the I/O scheduler 111 sends the command of the flow to the third priority class queue 219c.

Further, in some embodiments, when a difference between the first to fourth flows (Flow1 to Flow4) or the virtual times (vta to vtd) of the first to fourth commands (CMD1 to CMD4) of the first to fourth flows (Flow1 to Flow4) and the global virtual time (gvt) is less than a second threshold (tm), the I/O scheduler 111 sends that command to the first priority class queue 219a. Here, the second threshold (tm) may be less than the first threshold (tl).

Further, in some embodiments, when a difference between the first to fourth flows (Flow1 to Flow4) or the virtual times (vta to vtd) of the first to fourth commands (CMD1 to CMD4) of the first to fourth flows (Flow1 to Flow4) and the global virtual time (gvt) is less than the first threshold (tl) and greater than the second threshold (tm), the I/O scheduler 111 sends that command to the second priority class queue 219b.

Here, each of the first to third priority class queues 219a to 219c have processing speeds that differ from each other.

Figure 4:
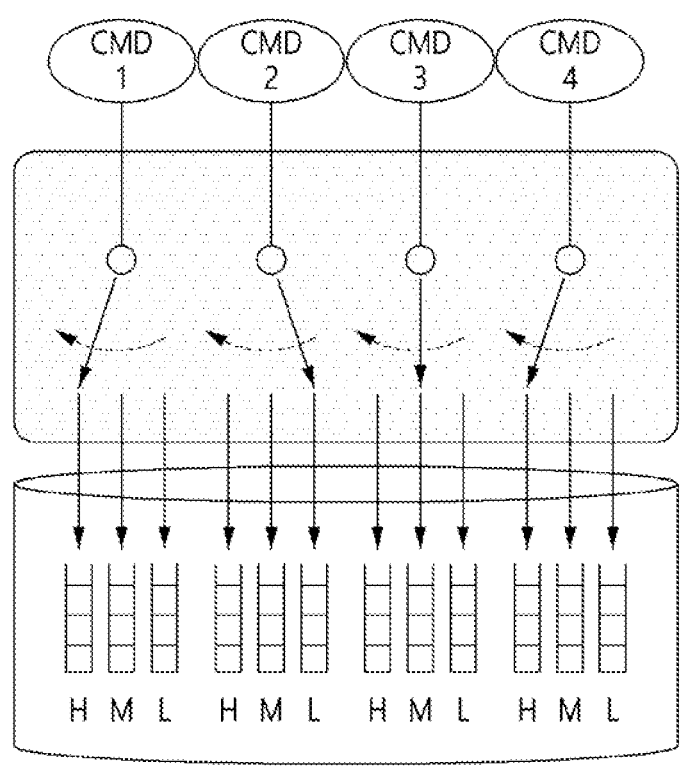
Figure 6:
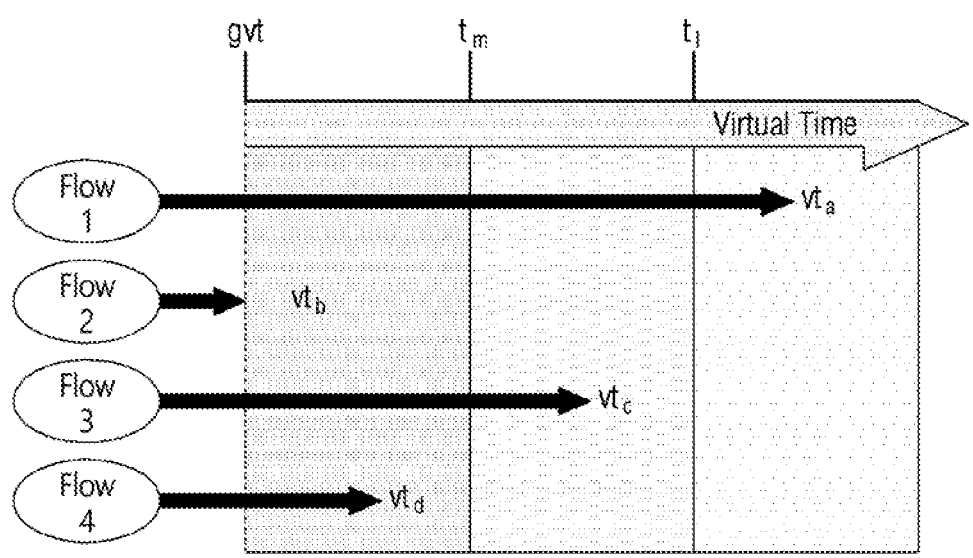

Referring to FIGS. 3, 4 and 6, it is assumed that the flow (Flow) has first to fourth commands (CMD1 to CMD4).

In some embodiments, each of the first to fourth commands (CMD1 to CMD4) has first to fourth virtual times (vta to vtd), respectively.

In some embodiments, the I/O scheduler 111 compares the first to fourth virtual times (vta to vtd) to determine a standard global virtual time (gvt). Here, the global virtual time (gvt) is a minimum of the first to fourth virtual times (vta to vtd). The global virtual time (gvt) is a first virtual time (vta).

In some embodiments, the I/O scheduler 111 compares the second to fourth virtual times (vtb to vtd) to the first virtual time (vta), which is the global virtual time (gvt), and sends each of the second to fourth commands (CMD2 to CMD4) to one of the first to third priority class queues 219a to 219c.

Referring to FIGS. 3 and 6, in some embodiments, since the first virtual time (vta) is the global virtual time (gvt), the I/O scheduler 111 sends the first command CMD1 to the first priority class queue 219a.

Referring to FIGS. 3 and 6, in some embodiments, when comparing the second virtual time (vtb) with the global virtual time (gvt), because a value obtained by subtracting the global virtual time (gvt) from the second virtual time (vtb) is less than the second threshold (tm), the I/O scheduler 111 sends the second command CMD2 to the first priority class queue 219a.

Referring to FIGS. 3 and 6, in some embodiments, when comparing the third virtual time (vtc) with the global virtual time (gvt), because the value obtained by subtracting the global virtual time (gvt) from the third virtual time (vtb) is greater than the first threshold (tl), the I/O scheduler 111 sends the third command CMD3 to the third priority class queue 219c.

Figure 5:
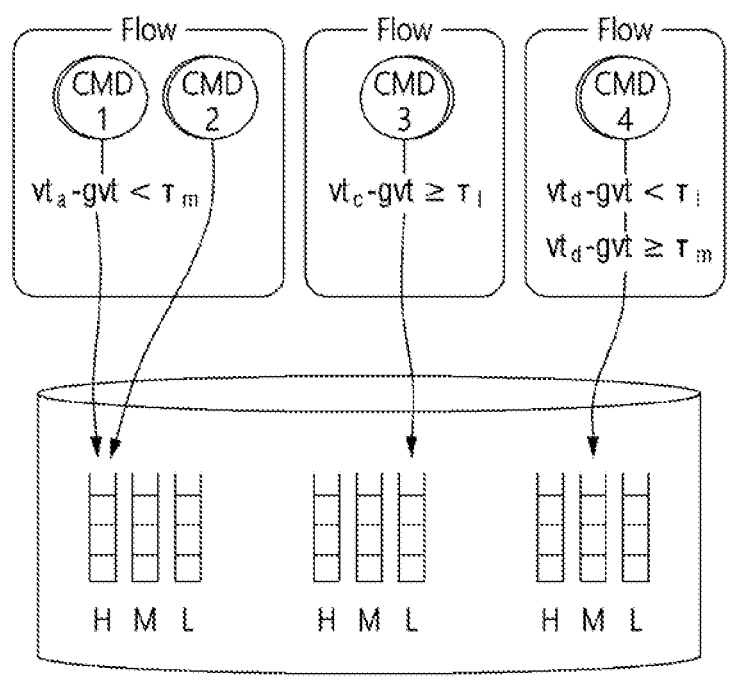

Referring to FIGS. 3 and 5, in some embodiments, when comparing the fourth virtual time (vtd) with the global virtual time (gvt), because a value obtained by subtracting the global virtual time (gvt) from the fourth virtual time (vtd) is greater than the second threshold (tm) and less than the first threshold (td), the I/O scheduler 111 sends the fourth command CMD4 to the second priority class queue 219b.

In this way, in some embodiments, by comparing the global virtual time (gvt) with the first to fourth virtual times (vta to vtd) in the I/O scheduler 111, and by immediately sending each of the first to fourth commands (CMD1 to CMD4) to one of the first to third priority class queues 219a to 219c, special processing is not required on the host controller 110. Thus, the usage of the host core is reduced.

Hereinafter, another method for the I/O scheduler 111 to queue the command CMD received from the host 100 to the priority class queues 219a to 219c will be described referring to FIGS. 6 and 7.

Hereinafter, differences from a method described referring to FIGS. 3 and 6 will be mainly described.

Figure 7:
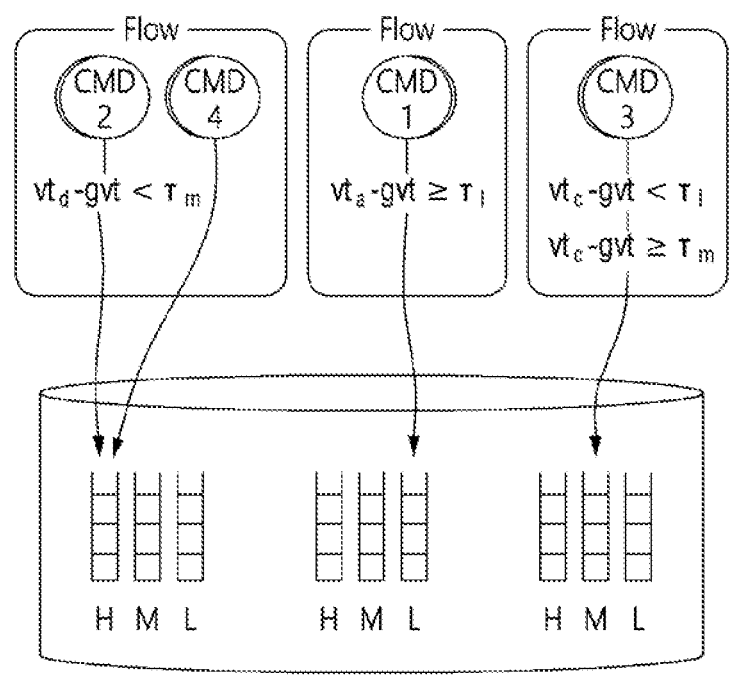

Referring to FIGS. 6 and 7, in some embodiments, the global virtual time (gvt) is the second virtual time (vtb) of the second command CMD2.

In some embodiments, the I/O scheduler 111 compares the first to fourth virtual times (vta to vtd) with the second virtual time (vtb), which is the global virtual time (gvt), and sends each of the first to fourth commands (CMD1 to CMD4) to one of the first to third priority class queues 219a to 219c.

In some embodiments, when comparing the first virtual time (vta) with the global virtual time (gvt), because the value obtained by subtracting the global virtual time (gvt) from the first virtual time (vta) is greater than the first threshold (tl), the I/O scheduler 111 sends the first command CMD1 to the third priority class queue 219c.

In some embodiments, since the second virtual time (vtb) is the global virtual time (gvt), the I/O scheduler 111 sends the second command CMD2 to the first priority class queue 219a.

In some embodiments, when comparing the third virtual time (vtc) with the global virtual time (gvt), since the value obtained by subtracting the global virtual time (gvt) from the third virtual time (vtc) is greater than the second threshold (tm) and less than the first threshold (tl), the I/O scheduler 111 sends the third command CMD3 to the second priority class queue 219b.

In some embodiments, when comparing the fourth virtual time (vtd) with the global virtual time (gvt), since the value obtained by subtracting the global virtual time (gvt) from the fourth virtual time (vtd) is less than the second threshold (tm), the I/O scheduler 111 may send the fourth command CMD4 to the first priority class queue 219a.

Referring to FIG. 2 again, in some embodiments, the I/O scheduler calculates the processing frequency (S130). Further, the I/O scheduler sends the calculated processing frequency (S140) to the WRR arbitration unit 219. The WRR arbitration unit 219 performs the command in the queue in a weighted round robin manner on the basis of the processing frequency. Further, the WRR arbitration unit 219 adjusts the processing speed of multiple queues on the basis of the processing frequency (S150).

Specifically, a method for adjusting the processing speed of the multiple queues by the WRR arbitration unit 219 on the basis of the processing frequency sent from the I/O scheduler 111 according to some embodiments will be described.

In some embodiments, the I/O scheduler 111 calculates a first processing frequency value hn, where n is a natural number, of the first to third priority class queues 219a to 219c. Further, the WRR arbitration unit 219 adjusts the processing speeds of the first to third priority class queues 219a to 219c on the basis of the first processing frequency value (hn) and an amount of an increase in the virtual time of the command. Here, the first processing frequency value (hn) is obtained by dividing the processing speed of the currently set first priority class queue 219a by the processing speed of the third priority class queue 219c.

In some embodiments, the I/O scheduler 111 calculates a second processing frequency value (hn+1) of the first to third priority class queues 219a to 219c of the WRR arbitration unit 219 on the basis of the first processing frequency value (hn). Further, the WRR arbitration unit 219 adjusts the processing speed of the first to third priority class queues 219a to 219c on the basis of the second processing frequency value (hn+1).

In some embodiments, the second processing frequency value (hn+1) is calculated by multiplying a ratio of a virtual time increase amount $\Delta vt_{max}$ of the first command CMD1 and a virtual time increase amount $\Delta vt_{min}$ of the third command CMD3 by the first processing frequency value (hn). Here, the first command CMD1 is that having the greatest virtual time, and the third command CMD3 is that having the least virtual time.

The second processing frequency values (hn+1) is calculated from the following Formula 1.

$$h_{n+1} = \left(\frac{\Delta vt_{max}}{\Delta vt_{min}} \times h_n\right) + 1. \quad \text{Formula 1}$$

Here, $h_{n+1}$ is a second processing frequency value, $h_n$ is a first processing frequency value, $\Delta vt_{max}$ is a virtual time increase amount of the first command, and $\Delta vt_{min}$ is a virtual time increase amount of the third command.

However, in some embodiments, if the second processing frequency value (hn+1) calculated according to Formula 1 is too large, the processing speed of multiple queues will not be constantly adjusted.

In this case, in some embodiments, the process of calculating the second processing frequency value (hn+1) includes a process of calculating a slowdown value (slowdown (f)), and the calculated slowdown value (slowdown (f)) becomes the second processing frequency value (hn+1).

In some embodiments, the slowdown value (slowdown (f)) is a minimum processing speed adjustment ratio of the multiple queues. That is, the second processing frequency value (hn+1) is a maximum value of the slowdown value (slowdown (f)) as in Formula 2 below.

$$h_{n+1} = \text{Max}(\text{slowdown}(f)). \quad \text{Formula 2:}$$

The slowdown value (slowdown (f)) is calculated from the following Formula 3.

$$slowdown(f) = \frac{\sum l_{f,h} * \frac{P_h}{P_h} + \sum l_{f,m} * \frac{P_h}{P_m} + \sum l_{f,l} * \frac{P_h}{P_l}}{\sum l_{f,h} + \sum l_{f,m} + \sum l_{f,l}}. \quad \text{Formula 3}$$

Here, $\Sigma l_{f,h}$ is a total number of all commands sent to the first priority class queue by the flow f, $\Sigma l_{y,m}$ is a total number of all commands sent to the second priority class queue by the flow f, $\Sigma l_{f,l}$ is a total number of all commands sent to the third priority class queue by the flow f, $P_h$ is a processing frequency value of the first priority class queue, $P_m$ is a processing frequency value of the second priority class queue, and $P_l$ is a processing frequency value of the third priority class queue.

In some embodiments, the I/O scheduler 111 calculates the processing frequency of the first to third priority class queues 219a to 219c and transmits the processing frequency to the WRR arbitration unit 219 to adjust the processing speeds of the multiple queues, thereby ensuring fairness of the processing speeds.

For example, in some embodiments, the I/O scheduler 111 calculates the second processing frequency value (hn+1) from the processing frequency of the first priority class queue 219a, calculates a square root of the second processing frequency value (hn+1) from the processing frequency of the second priority class queue 219b, and calculates the natural number 1 for the processing frequency of the third priority class queue 219c, and sends the values to the WRR arbitration unit 219. Setting the queue processing speed is not necessarily limited to the three priority class queues, but can be set in any form for adjusting the processing speed difference of two or more priority class queues.

In concluding the detailed description, those skilled in the art will appreciate that many variations and modifications may be made to embodiments without substantially departing from the principles of the present disclosure. Therefore, disclosed embodiments of the disclosure are used in a generic and descriptive sense only and not for purposes of limitation.

What is claimed is:

1. A method of queuing a first command requested by a first program and a second command requested by a second program in a host storage system that includes a host and a storage device that communicate using a NVMe (Non-Volatile Memory Express) interface, wherein the first program is associated with a first virtual time and the second program is associated with a second virtual time, wherein each virtual time refers to a value determined by dividing a total amount of provided input/output services of a respective program by respective weights of each program, the method comprising:

comparing, by the I/O scheduler, the first virtual time of the first command with the second virtual time of the second command, and obtaining a comparison result;

determining, by the I/O scheduler, a global virtual time from the first virtual time and the second virtual time on the basis of the comparison result, wherein the global virtual time is a minimum of the first virtual time and the second virtual time; and sending, by the I/O scheduler, each of the first and second commands to one of a first priority class queue, a second priority class queue, or a third priority class queue, based on a comparison of a difference between the first virtual time and the global virtual time with a first threshold, and a difference between the second virtual time and the global virtual time with the first threshold, wherein each of the first to third priority class queues has processing speeds in the storage device that differ from each other, and commands in each of the first to third priority class queues are performed on the basis of the respective processing speed.

2. The queuing method of claim 1, wherein when the difference between the first virtual time and the global virtual time is greater than the first threshold, the first command is sent to the third priority class queue, and when the difference between the first virtual time and the global virtual time is less than the first threshold and less than a second threshold, the first command is sent to the first priority class queue.

3. The queuing method of claim 2, wherein when the difference between the first virtual time and the global virtual time is greater than the second threshold and less than the first threshold, the first command is sent to the second priority class queue.

4. The queuing method of claim 1, further comprising: receiving, by the I/O scheduler, a third command requested by a third program; comparing, by the I/O scheduler, the first virtual time of the first command with a third virtual time of the third command;

and comparing, by the I/O scheduler, the second virtual time of the second command with the third virtual time of the third command, wherein determining the global virtual time includes determining a minimum virtual time of the first to third virtual times.

5. The queueing method of claim 1, further comprising: calculating, by the I/O scheduler, a first processing frequency value of the first to third priority class queues; and adjusting, by the storage device, processing speeds of the first to third priority class queues based on the first processing frequency value.

6. The queueing method of claim 5, wherein the first processing frequency value is obtained by dividing the processing speed of the first priority class queue by the processing speed of the third priority class queue.

7. The queueing method of claim 6, further comprising: calculating a second processing frequency value of the first to third priority class queues from the first processing frequency value, and calculating virtual time increase amounts of the first command and the second command, and further adjusting the processing speeds of the first to third priority class queues based on the second processing frequency value.

8. The queueing method of claim 7, wherein the second processing frequency value is calculated by multiplying a ratio of the virtual time increase amount of the first command and the virtual time increase amount of a third command by the first processing frequency value.

9. A host-storage system, comprising: a host interface configured to receive a first command requested by a first program and a second command requested by a second program-from a host through an NVMe (Non-Volatile Memory Express) interface, wherein the first program is associated with a first virtual time and the second program is associated with a second virtual time, wherein each virtual time refers to a value determined by dividing a total amount of provided input/output services of a respective program by respective weights of each program; a WRR arbitration unit that includes first to third priority class queues;

and an I/O scheduler configured to determine a global virtual time from a first virtual time of the first command and a second virtual time of the second command, wherein the global virtual time is a minimum of the first virtual time and the second virtual time, and send each of the first and second commands to the first to third priority class queues using a comparison of a difference between the first virtual time and the global virtual time with a first threshold, and a comparison of a difference between the second virtual time and the global virtual time with the first threshold, wherein the WRR arbitration unit is configured to receive a different processing frequency calculated for each of the priority class queues from the I/O scheduler and perform the command in the queue in a weighted round robin manner on the basis of the processing frequency.

10. The host-storage system of The host-storage system of wherein the I/O scheduler is configured to calculate first processing frequency values of the first to third priority class queues, and wherein the WRR arbitration unit is configured to adjust the processing speeds of the first to third priority class queues on the basis of the first processing frequency values.

11. The host-storage system of The host-storage system of wherein the I/O scheduler is configured to calculate second processing frequency values of the first to third priority class queues, and wherein the WRR arbitration unit is further configured to adjust the processing speeds of the first to third priority class queues on the basis of the second processing frequency values.

* * * * *